Dec. 8, 1942.　　　A. B. NEWTON　　　2,304,192
REFRIGERATION OF HYGROSCOPIC MATERIAL
Filed Aug. 16, 1940　　　2 Sheets-Sheet 2
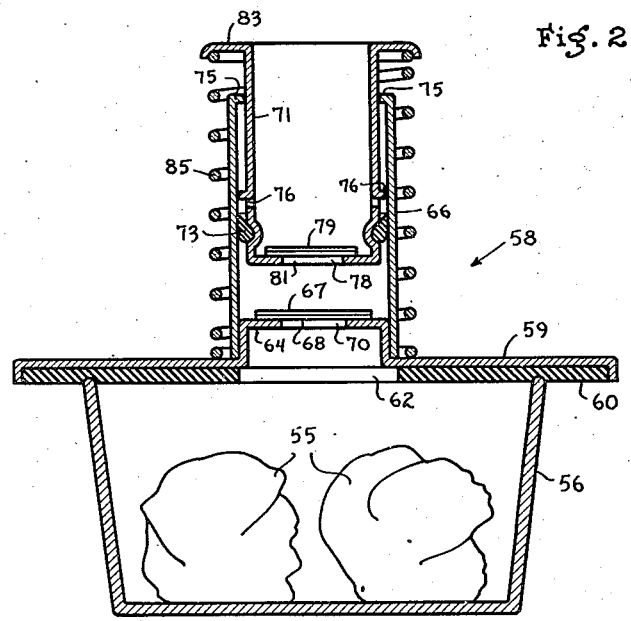
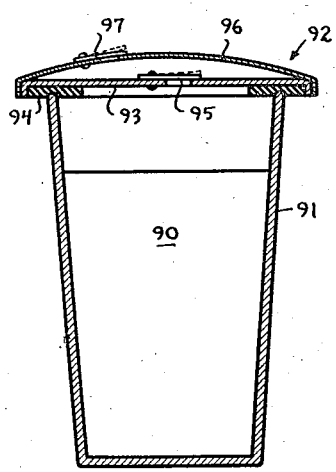
INVENTOR
Alwin B. Newton
BY George H Fisher
ATTORNEY Patented Dec. 8, 1942

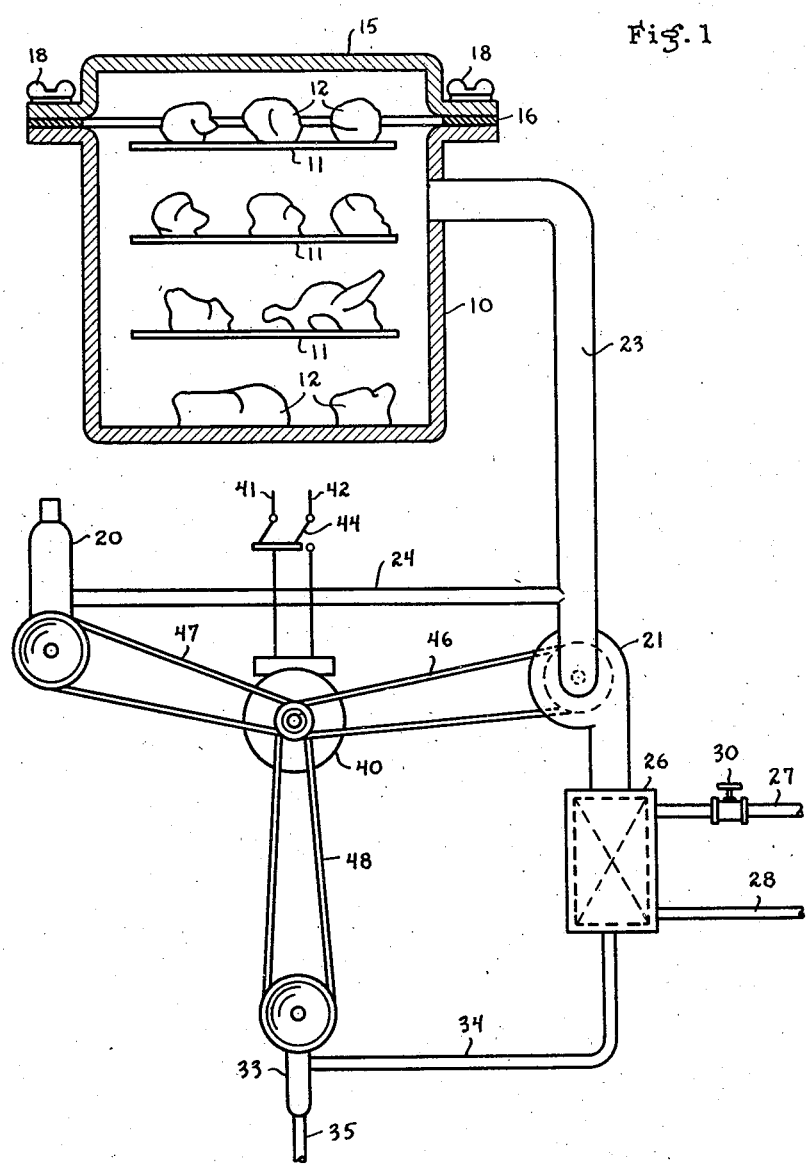

2,304,192

UNITED STATES PATENT OFFICE 2,304,192

REFRIGERATION OF HYGROSCOPIC MATERIAL

Alwin B. Newton, Minneapolis, Minn., assignor to Minneapolis-Honeywell Regulator Company, Minneapolis, Minn., a corporation of Delaware Application August 16, 1940, Serial No. 353,899

5 Claims. (Cl. 62—1)

The present invention relates to means for cooling materials containing water and more particularly to means for cooling and freezing food products.

It is an object of the present invention to provide means for quickly cooling or freezing materials having an appreciable water content.

It is also an object of this invention to provide means for cooling food products by reducing the surrounding vapor pressure thereby causing evaporation of water contained in the product which evaporation will produce a refrigerating effect to cool the product.

A further object is to provide a refrigerating apparatus in which air is first removed from a container by means of an air pump and the cooling is accomplished by removing water vapor by means of a centrifugal compressor operating into a condenser.

A further object is to provide means for cooling products placed in an ordinary open top container for causing vaporization of a portion of the water contained in the products.

Further objects will be apparent from the accompanying drawings, the specification and from the appended claims.

In the drawings:

Figure 1 shows an apparatus for freezing products by means of a power driven air pump and a centrifugal fan;

Figure 2 shows a manually operable device for cooling products in a container; and Figure 3 shows another form of manual device for cooling products in a container.

It has become the practice in recent years to preserve food products by freezing them when fresh. The frozen product may then be stored or shipped without diminution of the quality thereof. In order that the fibrous structure of the food will not be broken by the formation of large ice crystals during the freezing period, attempts have been made to secure rapid freezing. One of the current methods is to stack the food in thin layers between plates supplied with a refrigerant. Another method is to spray the product with cold brine. While these methods result in much faster freezing than would be the case if the product was merely placed in a refrigerated space, the time required is still rather great especially in the case of meat and vegetables having large volume.

The present invention provides a method of quickly cooling or freezing food products by causing a refrigerating effect within the product itself and which, therefore, is substantially independent of the thickness or volume of the product. Since the interior of the product is cooled at the same rate as the exterior, no time is required for heat to be conducted through the product and the process can be very rapid. The method employed involves reducing the pressure surrounding the product to a point where evaporation of the contained moisture is rapid. Vaporization of the moisture contained in the product results in abstraction of heat from the unvaporized portion and consequent refrigeration thereof. Since all vegetable products and meats are porous, the pressures at all points within them will remain substantially equal during the process. This method has been found to be workable with foods containing very small amounts of water. The quality of the resulting product is superior due to the small size of the ice crystals.

In the apparatus illustrated in Figure 1, a container 10 of relatively heavy gage material which will be pressure tight has a plurality of shelves 11 suitably supported therein. These shelves 11 are adapted to support food products 12 such as meats, vegetables or any other produce containing a substantial amount of water in their structure. The container 10 is closed at the top by a cover 15 and a gasket 16 serves to render the joint between the cover 15 and the container 10 air tight. Wing nuts 18 cooperate with bolts, not shown, to draw the cover 15 tightly against the gasket 16.

Means are provided to remove air and moisture from the container 10 including a positive displacement air pump 20 and a centrifugal compressor 21. A duct or pipe 23 contacts the container 10 with the intake of the centrifugal compressor 21 while a second pipe 24 leads from the pipe 23 to the intake of the air pump 20.

A water cooled condenser 26 receives the discharge from the centrifugal compressor 21. Cooling water is supplied to the condenser by a supply pipe 27 and is carried away by a discharge pipe 28. A valve 30 in the intake pipe 27 serves to control the flow of cooling water to the condenser 26. A condensate pump 33 is connected to the condenser 26 by means of a pipe 34 and removes condensed liquid from the condenser 26 in the usual manner. The discharge of condensate pump 33 is carried away to the drain by a pipe 35.

When the container 10 is closed a large part of the volume of the container itself as well as of the pipes 23 and 24, the centrifugal compressor 21 and the condenser 26 will be filled with air. The centrifugal compressor 21 operating into the condenser 26 is only capable of removing condensible vapors from the container 10 so the positive displacement pump 20 is provided to remove air and other non-condensible gases. When moisture from the food products is present it will be removed by the centrifugal compressor 21.

An electric motor 40 is supplied with power from line wires 41 and 42. A switch 44 is provided to control the supply of power to the motor 40. The motor 40 drives the centrifugal compressor 21 through a belt 46, the air pump 20 through a belt 47 and the condensate pump 33 through a belt 48.

In operation, the food products to be frozen or cooled are placed in the container 10 on the shelves 11 and the cover 15 secured to the container 10 by means of the wing nuts 16 to form a pressure tight vessel. The switch 44 is closed to start the motor 40 which simultaneously operates the air pump 20, the centrifugal compressor 21, and the condensate pump 33. At first the air pump 20 removes the air from the container 10. When moisture evaporates from the products contained in the container 10, the gases flowing through the pipe 23 will contain a large percentage of water vapor which will be forced into the condenser 26 by the centrifugal compressor 21. This moisture will be condensed in the condenser 26 and the water of condensation will be withdrawn through the pipe 34 by the condensate pump 33. The rate of cooling of the product will depend on the amount of power supplied to the centrifugal compressor 21. If sufficient power is supplied it is possible to freeze the food products in a very short time. Certain food products may be frozen in a few seconds as compared with several minutes required under conventional methods of freezing foods.

In Figure 2 is shown a device which may be employed to cool or freeze food products contained in an ordinary vessel such as is used in the home. It is to be understood however, that this device could be made in any size. Food products 55 containing water in their composition are placed in a container 56. The device employed for removing a percentage of the moisture from the food products to cool them is generally illustrated at 58. A flat plate 59 which is covered by a gasket 60 on its lower face is placed in contact with the container 56. The gasket 60 is of substantial area so that a pressure-tight seal may be made with containers of various sizes. The gasket 60 is provided with an opening 62 at the center thereof. The plate 59 has an offset portion 64 at its center which serves to support a cylinder 66 at right angles to the plate 59. A flat disk 67 having a lower surface 68 of resilient material normally rests on the top surface of the offset portion 64 of the plate 59 and covers an opening 70 therein.

Slidably carried by the interior of the cylinder 66 is a second cylindrical member 71. A gasket 73 serves as a sealing ring between the cylinders 66 and 71. The gasket 73 is of the type adapted to prevent the passage of fluids in a downward direction as seen in the drawings. The cylinder 66 is provided at its uppermost edge with turned-in portions 75 to guide the cylinder 71. Likewise, the cylinder 71 is provided with turned-out portions 76 to guide the lower portion of the cylinder 71. The lower portion of the cylinder 71 is provided with an opening 78 which is covered by a disk 79. The disk 79 has a lower surface 81 of resilient material to form a tight seal against the lower portion of the cylinder 71.

The upper extremity of the cylinder 71 is provided with an outwardly extending flat portion 83 which serves as the upper abutment for a spring 85. The lower abutment for the spring 85 is provided by the plate 59.

In operation, food products are placed in the container 56 and the device 58 is placed over the container in such a manner that the gasket 60 forms a pressure tight seal therewith. Normally, the spring 85 maintains the cylinder 71 at its uppermost position. Force is applied manually to the flat portion 83 at the upper extremity of the cylinder 71 to force this cylinder downwardly. During this operation the air pressure below the cylinder 71 is increased so that the pressure below the disc 79 will offset that above it to raise the disk 79 slightly, permitting the gases to escape. When the pressure applied to the flat portion 83 is removed, the spring 85 will again raise the cylinder 71 to reduce the pressure below it. The pressure within the container 56 will then be sufficient to raise the disk 67, permitting air and moisture to flow therefrom. It will be seen that repeated actuation of the cylinder 71 will result in lowering of the pressure within the container 56 to vaporize the moisture contained in the food products 55 and cause cooling of these products.

A rather simple form of product cooler is shown in Figure 3. Any product 90 containing moisture is placed in a container 91 which is covered by a pumping device 92. A plate 93 is provided with a gasket 94 on its lower surface to form a pressure tight seal between the plate 93 and the container 91. The plate 93 is provided with a check valve 95 which permits the passage of gases from the container 91 to the space above it but will not permit the passage of gases in the opposite direction. A flexible diaphragm 96 which is bowed upwardly in the middle is secured at its periphery to the plate 93. The diaphragm 96 is provided with a check valve 97 which prevents the flow of air from the surrounding atmosphere into the space between the diaphragm 96 and the plate 93.

The operation of this device is as follows. The diaphragm 96 is alternately depressed and released which results in pumping of gases from the container 91 to the surrounding atmosphere. When the diaphragm is depressed the check valve 97 moves upwardly to permit the escape of gas from the space between the diaphragm 96 and the plate 93. When the diaphragm is released check valve 97 closes and check valve 95 opens to permit gases to pass from the container. Repeated operations will lower the pressure within the container 91 which will result in vaporization of the moisture contained in the food product 90. This will result in cooling or freezing of the product 90.

Thus it will be seen that I have provided a novel method of cooling and freezing products containing moisture in their composition. It is to be understood that I am not to be limited by the specific disclosure but only by the scope of the appended claims.

I claim as my invention:

1. In a device for cooling products, in combination, a relatively stationary member adapted to cooperate with a container for products containing volatile constituents to close an opening therein and a pressure tight seal therewith, a reciprocable member secured to said stationary member and forming an enclosed space between said two members, a check valve in said stationary member for preventing flow of gases into the container but permitting flow of gases from the container, and a check valve in said reciprocable member for preventing flow of gases into the space between said two members.

2. In a device for cooling products, in combination, a relatively stationary member adapted to cooperate with a container for products containing volatile constituents to close an opening therein and form a pressure tight seal therewith, a cylinder mounted on said member, a reciprocable member slidably mounted with respect to said cylinder and forming an inclosed space together with said stationary member and said cylinder, a first check valve in said stationary member preventing flow of gases into the container but permitting flow of gases from the container into the inclosed space, and a second check valve in said reciprocable member preventing flow of gases from the atmosphere to the inclosed space but permitting flow of gases from the inclosed space to the atmosphere, whereby successive movements of said reciprocable member will cause a lowering of the pressure within the container causing vaporization of volatile liquids in products contained therein.

3. In a device for cooling products, in combination, a relatively flat stationary member adapted to cooperate with a container for products containing volatile constituents to close an opening therein and form a pressure tight seal therewith, a cylinder mounted on said stationary member and relatively perpendicularly thereto, a reciprocable member slidably mounted with respect to said cylinder and forming an inclosed space together with said stationary member and said cylinder, a spring operating on said stationary member and on said reciprocable member tending to increase the volume in the inclosed space, a first check valve in said stationary member preventing flow of gases into the container but permitting flow of gases from the container into the inclosed space, and a second check valve in said reciprocable member preventing flow of gases from the atmosphere to the inclosed space but permitting flow of gases from the inclosed space to the atmosphere, whereby successive movements of said reciprocable member will cause a lowering of the pressure within the container causing vaporization of volatile liquids in the products contained therein.

4. In a device for cooling products, in combination, a relatively stationary member adapted to cooperate with a container for products containing volatile constituents to close an opening therein and form a pressure tight seal therewith, a cylinder mounted on said member, a reciprocable member slidably mounted with respect to said cylinder and forming an inclosed space together with said stationary member and said cylinder, a spring operating on said stationary member and on said reciprocable member tending to increase the volume in the inclosed space, a check valve in said stationary member preventing flow of gases into the container but permitting flow of gases from the container through said member, and a gasket between said cylinder and said reciprocable member, said gasket being adapted to prevent flow of air into the inclosed space when the pressure therein is below atmospheric pressure.

5. In a device for cooling products, in combination, a relatively stationary member adapted to cooperate with a container for products containing volatile constituents to close an opening therein and form a pressure tight seal therewith, a flexible diaphragm fastened at its edges to said stationary member and forming an enclosed space in conjunction with said stationary member, said diaphragm being adapted by manual manipulation to vary the volume of the enclosed space, and check valves in said member and in said diaphragm for preventing the flow of gases into the container, but permitting flow of gases out of the container and the enclosed space.

ALWIN B. NEWTON.